US012065383B2

(12) United States Patent
Watanabe et al.

(10) Patent No.: US 12,065,383 B2
(45) Date of Patent: Aug. 20, 2024

(54) ORIENTED CERAMIC SINTERED BODY PRODUCTION METHOD AND FLAT SHEET

(71) Applicant: NGK INSULATORS, LTD., Nagoya (JP)

(72) Inventors: Morimichi Watanabe, Nagoya (JP); Kei Sato, Tokai (JP); Kiyoshi Matsushima, Nagoya (JP); Takahiro Maeda, Ichinomiya (JP); Jun Yoshikawa, Nagoya (JP); Tsutomu Nanataki, Toyoake (JP)

(73) Assignee: NGK INSULATORS, LTD., Nagoya (JP)

(*) Notice: Subject to any disclaimer, the term of this patent is extended or adjusted under 35 U.S.C. 154(b) by 1009 days.

(21) Appl. No.: 16/818,025

(22) Filed: Mar. 13, 2020

(65) Prior Publication Data

US 2020/0216364 A1 Jul. 9, 2020

Related U.S. Application Data

(63) Continuation of application No. PCT/JP2018/039445, filed on Oct. 24, 2018.

(30) Foreign Application Priority Data

Oct. 27, 2017 (JP) ................. 2017-207783

(51) Int. Cl.
*C04B 35/00* (2006.01)
*C04B 35/111* (2006.01)
(Continued)

(52) U.S. Cl.
CPC .......... *C04B 35/645* (2013.01); *C04B 35/111* (2013.01); *C04B 35/638* (2013.01); *C04B 2235/3217* (2013.01)

(58) Field of Classification Search
None
See application file for complete search history.

(56) References Cited

U.S. PATENT DOCUMENTS

| 5,028,650 A | 7/1991 | Enloe et al. |
| 2004/0131533 A1* | 7/2004 | Spacie ............... H01M 8/0254 264/293 |

(Continued)

FOREIGN PATENT DOCUMENTS

| JP | H02-279569 A1 | 11/1990 |
| JP | H10-194847 A1 | 7/1998 |

(Continued)

OTHER PUBLICATIONS

JP-2007204299-A (Murakami) Aug. 2007 (online machine translation), [Retrieved on Aug. 29, 2022]. Retrieved from: Espacenet (Year: 2007).*

(Continued)

*Primary Examiner* — Seyed Masoud Malekzadeh
*Assistant Examiner* — Andres E. Behrens, Jr.
(74) *Attorney, Agent, or Firm* — BURR PATENT LAW, PLLC (57) ABSTRACT

An oriented ceramic sintered body production method includes (a) a step of preparing a ceramic compact before firing into an oriented ceramic sintered body; and (b) a step of obtaining an oriented ceramic sintered body by sandwiching the ceramic compact between a pair of releasing sheets, placing the ceramic compact and the releasing sheets in a hot press firing furnace, and hot press firing the ceramic compact while applying a pressure by a pair of punches through the pair of releasing sheets, wherein each of the releasing sheets is a releasing sheet such that, after the releasing sheet is sandwiched between PET films, is then placed and vacuum-packed on a stainless steel sheet, and is isostatically pressed at 200 kg/cm², a surface of the releasing sheet on the side (Continued)

opposite from the stainless steel sheet has a profile curve with a total profile height Pt of 0.8 μm or less.

7 Claims, 3 Drawing Sheets

(51) Int. Cl.
*C04B 35/32* (2006.01)
*C04B 35/638* (2006.01)
*C04B 35/645* (2006.01)

(56) References Cited

U.S. PATENT DOCUMENTS

| | | | | |
|---|---|---|---|---|
| 2008/0248277 | A1* | 10/2008 | Yokoyama | B32B 18/00 |
| | | | | 428/220 |
| 2009/0324886 | A1 | 12/2009 | Yuki et al. | |
| 2017/0166484 | A1 | 6/2017 | Matsushima et al. | |

FOREIGN PATENT DOCUMENTS

| | | | | |
|---|---|---|---|---|
| JP | 2009132602 | * | 1/2007 | |
| JP | 2007/204299 | * | 8/2007 | C01B 31/04 |
| JP | 2007-204299 | A1 | 8/2007 | |
| JP | 2007204299 | A * | 8/2007 | |
| JP | 2008-031020 | A1 | 2/2008 | |
| JP | 5002087 | B2 | 8/2012 | |
| JP | 6490881 | B1 * | 3/2019 | C04B 35/111 |
| WO | 2008/015952 | A1 | 2/2008 | |
| WO | WO-2016084721 | A1 * | 6/2016 | C01F 7/442 |

OTHER PUBLICATIONS

JP-2009132602 (Nishikawa) Jan. 2007 (online machine translation), [Retrieved on Dec. 5, 2022]. Retrieved from: Espacenet (Year: 2007).*

JP-6490881-B1 (Ji) May 1991 (online machine translation), [Retrieved on Dec. 5, 2022]. Retrieved from: Espacenet (Year: 2019).*

JP-2007/204,299 (Ota) Aug. 2007 (online machine translation), [Retrieved on Apr. 27, 2023]. Retrieved from: Espacenet (Year: 2007).*

WO-2016084721-A1 (Matsushima) Jun. 2016 (online machine translation), [Retrieved on Apr. 27, 2023]. Retrieved from: Espacenet (Year: 2016).*

P-2007/204,299 (Ota) Aug. 2007 (online machine translation), [Retrieved on Apr. 27, 2023]. Retrieved from: Espacenet (Year: 2007).*

Brassell, Gilbert W., et al. "Effects of Porosity on Strength of Carbon-Carbon Composites." Journal of Composite Materials, vol. 9, No. 3, SAGE Publishing, Jul. 1975, pp. 288-296. https://doi.org/10.1177/002199837500900307. (Year: 1975).*

International Journal of Precision Engineering and Manufacturing, vol. 14, No. 7, Springer Science+Business Media, Jul. 2013, pp. 1177-1183. https://doi.org/10.1007/s12541-013-0160-5. (Year: 2013).*

English translation of the International Preliminary Report on Patentability (Chapter I) (Application No. PCT/JP2018/039445) dated May 7, 2020.

International Search Report and Written Opinion (Application No. PCT/JP2018/039445) dated Dec. 4, 2018.

Chinese Office Action (Application No. 201880055098.7) dated Sep. 9, 2021 (with English translation).

* cited by examiner

Fig. 5 ization sheet on the side opposite from the stainless
ORIENTED CERAMIC SINTERED BODY PRODUCTION METHOD AND FLAT SHEET

BACKGROUND OF THE INVENTION

1. Field of the Invention

The present invention relates to an oriented ceramic sintered body production method and a flat sheet.

2. Description of the Related Art

A hot pressing method that involves firing a ceramic powder or a ceramic compact at a high temperature while applying a pressure is known as a method for firing a ceramic. When a ceramic is produced by a hot pressing method, typically, a spacer is placed between samples to protect the samples and press parts. In order to avoid stress concentration caused by the difference in thermal expansion coefficient between the spacer and other parts, the spacer is composed of the same material as other parts in most cases. For example, in general, in an inert atmosphere, all of the parts are composed of graphite, and in an oxidizing atmosphere, all of the parts are composed of alumina or silicon carbide. However, this method has a problem in that, since the sample directly contacts the spacer, the sample reacts with the spacer, resulting in adhesion and cracking of the spacer. To address this, a method involving providing a releasing material between a sample and a spacer has been proposed (for example, PTL 1 to PTL 3).

CITATION LIST

Patent Literature

PTL 1: JP 10-194847 A
PTL 2: JP 5002087 B
PTL 3: JP 2008-031020 A

SUMMARY OF THE INVENTION

However, when an oriented ceramic sintered body is produced by using these methods, there is a problem in that a pressure applied during hot press firing causes the surface of the releasing material to undulate, resulting in deviation of the crystal orientation of the surface of the oriented ceramic in contact with the releasing material. This problem also arises when a releasing sheet composed of expandable graphite described in PTL 3 is used.

The present invention has been made to address these problems, and a main object thereof is to suppress deviation of the crystal orientation of the surface of an oriented ceramic sintered body from the crystal orientation of the inside of the oriented ceramic sintered body.

An oriented ceramic sintered body production method of the present invention includes:
(a) a step of preparing a ceramic compact before firing into an oriented ceramic sintered body; and
(b) a step of obtaining an oriented ceramic sintered body by sandwiching the ceramic compact between a pair of releasing sheets, placing the ceramic compact and the releasing sheets in a hot press firing furnace, and hot press firing the ceramic compact while applying a pressure by a pair of punches through the pair of releasing sheets,
in which each of the releasing sheets is a releasing sheet such that, after the releasing sheet is sandwiched between PET films having a thickness of 75 μm and an arithmetic mean surface roughness Ra of 0.03 μm, is then placed and vacuum-packed on a stainless steelsheet having a thickness of 10 mm and having an arithmetic mean surface roughness Ra of 0.29 μm, and is isostatically pressed at 200 kg/cm², a surface of the releasing sheet on the side opposite from the stainless steel sheet has a profile curve with a total profile height Pt of 0.8 μm or less.

In this production method, a sheet having a profile curve with a total profile height Pt of 0.8 μm or less (preferably 0.5 μm or less) as measured under the aforementioned conditions is used as the releasing sheet. Thus, undulation of the oriented ceramic sintered body obtained by hot press firing is avoided, and deviation of the surface crystal orientation from the inside crystal orientation can be suppressed. Thus, high-quality oriented ceramic sintered body is obtained.

DETAILED DESCRIPTION OF THE INVENTION

An oriented ceramic sintered body production method according to the present invention includes:
(a) a step of preparing a ceramic compact before firing into an oriented ceramic sintered body; and
(b) a step of obtaining an oriented ceramic sintered body by sandwiching the ceramic compact between a pair of releasing sheets, placing the ceramic compact and the releasing sheets in a hot press firing furnace, and hot press firing the ceramic compact while applying a pressure by a pair of punches through the pair of releasing sheets.

In step (a), a ceramic compact before firing into an oriented ceramic sintered body is prepared. For example, a slurry containing a mixed ceramic powder containing a plate-like ceramic powder and a fine ceramic powder having an average particle diameter smaller than that of the plate-like ceramic powder, a binder, and a dispersing medium may be formed into a ceramic compact. In this case, the ceramic compact may be degreased before performing hot press firing in step (b). The degreasing temperature may be set to a temperature at which organic matter contained in the ceramic compact is removed by heat.

Figure 1A:
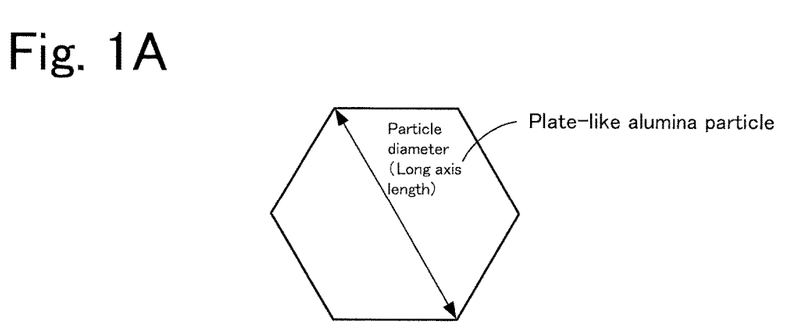
FIGS. 1A to 1B include schematic diagrams of a plate-like alumina particle, in which 1A is a plan view and 1B is a front view.
Figure 1B:
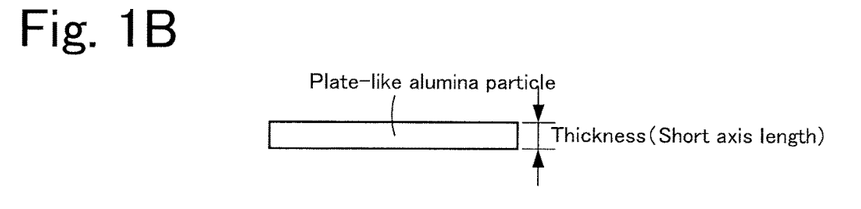

The plate-like ceramic powder preferably has an aspect ratio of 3 or more, for example. The aspect ratio is average particle diameter/average thickness. Here, the average particle diameter is the average value of the long axis lengths of the particle plate surfaces, and the average thickness is the average value of the short axis lengths of the particles. These values are determined by observing arbitrarily selected one hundred particles in the plate-like ceramic powder with a scanning electron microscope (SEM). Alumina, lead zirconate titanate (PZT), ZnO, BaTiO₃, and (K,Na)NbO₃ are known as the oriented ceramics, and the production method of the present invention is particularly preferable for producing oriented alumina sintered bodies among these oriented ceramics. FIGS. 1A to 1B include schematic diagrams of a plate-like alumina particle, in which 1A is a plan view and 1B is a front view. The plate-like alumina particle has a substantially hexagonal shape in plan, the particle diameter thereof is as illustrated in FIG. 1A, and the thickness thereof is as illustrated in FIG. 1B. The use of a plate-like alumina powder having an aspect ratio of 3 or more increases the degree of orientation of the alumina sintered body obtained as an end product. From the viewpoint of increasing the degree of orientation, the average particle diameter of the plate-like alumina powder is preferably large, and is preferably 1.5 μm or more, more preferably 5 μm or more, yet more preferably 10 μm or more, and particularly preferably 15 μm or more. However, from the viewpoint of densification, the average particle diameter is preferably small, and is preferably 30 μm or less. Thus, in order to achieve both a high degree of orientation and densification, the average particle diameter is preferably 1.5 μm to 20 μm. A plate-like alumina powder having a high purity is preferably used. The purity of the plate-like alumina powder is preferably 99 mass % or more, more preferably 99.9 mass % or more, and yet more preferably 99.99 mass % or more. However, impurities that evaporate and vanish during firing may be contained.

Figure 2:
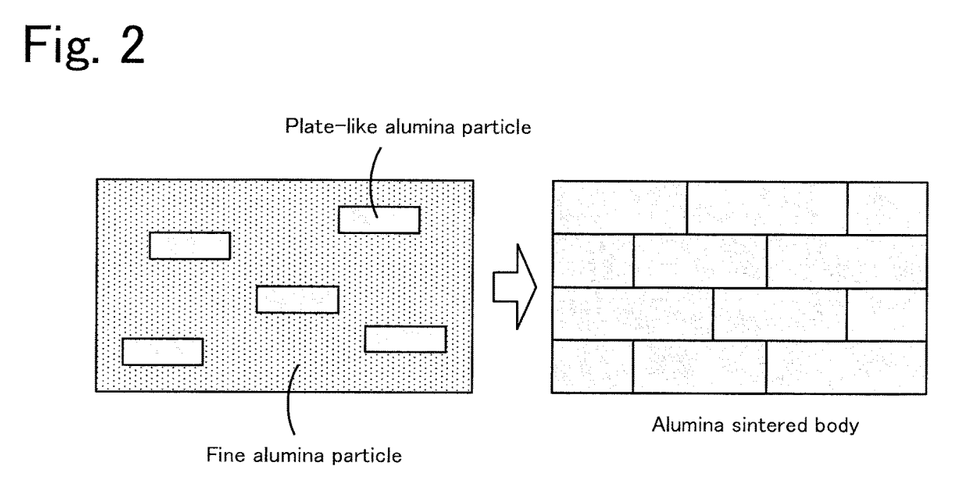
FIG. 2 is a schematic diagram of steps for preparing an alumina sintered body by a TGG method.

A fine ceramic powder is a powder having an average particle diameter smaller than that of the plate-like ceramic powder, and is of the same type as the plate-like ceramic powder. By using the mixed ceramic powder containing the plate-like ceramic powder and the fine ceramic powder, the plate-like ceramic particles become easily oriented during forming. Moreover, during firing, the plate-like ceramic powder serves as seed crystals (templates), and the fine ceramic powder serves as a matrix. Thus, homoepitaxial growth occurs as the templates incorporate the matrix. This production method is called a templated grain growth (TGG) method. When an oriented alumina sintered body is prepared, the mixing ratio of the plate-like alumina powder to the fine alumina powder in terms of mass ratio is preferably T:(100−T) (where T represents 0.001 to 50). This is because, at a T of less than 0.001, the degree of orientation of the alumina sintered body does not easily increase, and at a T exceeding 50, sintering of alumina may be inhibited. From the viewpoint of the degree of orientation, T is preferably 0.1 or more. Meanwhile, from the viewpoint of sinterability, T is preferably 15 or less. From the viewpoint of achieving both the degree of orientation and the sinterability, T is preferably 0.1 to 15. FIG. 2 is a schematic diagram of steps for preparing an alumina sintered body by a TGG method. In the TGG method, the properties of the obtained alumina sintered body can be controlled by the particle diameters and mixing ratios of the plate-like alumina powder and the fine alumina powder.

Examples of the binder include ethyl cellulose-based and butyral-based organic compounds. Examples of the dispersing medium include aromatic compounds such as 2-ethylhexanol, octanol, terpineol, butyl carbitol, and xylene, and alcohols, which can be used alone or in combination. In addition, a plasticizer, a dispersing agent, a sintering aid, etc., may be added. Examples of the plasticizer include organic compounds such as phthalic acid esters and adipic acid esters, and examples of the dispersing agent include esters of polyhydric alcohols and fatty acids, such as sorbitan trioleate. Examples of the sintering aid when the ceramic is alumina include $AlF_3$, $MgO$, $MgF_2$, $V_2O_3$, $CaO$, $CuO$, and $La_2O_3$, which can be added alone or in combination.

The releasing sheet used in step (b) is as follows. That is, after the releasing sheet is sandwiched between PET films having a thickness of 75 μm and an arithmetic mean surface roughness Ra of 0.03 μm, is then placed and vacuum-packed on a stainless steelsheet having a thickness of 10 mm and having an arithmetic mean surface roughness Ra of 0.29 μm, and is isostatically pressed at 200 kg/cm$^2$, a surface of the releasing sheet on the side opposite from the stainless steel sheet has a profile curve with a total profile height Pt of 0.8 μm or less (preferably 0.5 μm or less). When a releasing sheet having a profile curve with a total profile height Pt exceeding 0.8 μm is used in hot press firing, the crystal orientation near the surface of the obtained ceramic sintered body becomes slanted, and the orientation is degraded. The releasing sheet may be any material that has a profile curve with a total profile height Pt of 0.8 μm when measured as such and that does not react with structural parts of the hot press firing furnace or deteriorate the properties of the ceramic compact. For example, the releasing sheet may be a metal foil, or a formed sheet prepared by forming a slurry containing a releasing sheet raw material powder, a binder, and a dispersing medium. The thickness of the releasing sheet is not particularly limited; however, in a hot press firing furnace of the same size, a larger quantity of ceramic compacts can be fired by using thinner releasing sheets.

When a formed sheet is used as the releasing sheet, examples of the forming method include tape casting, extrusion molding, slip casting, injection molding, and uniaxial press forming. Among these, tape casting is preferable. Specific examples of the binder and the dispersing medium are as described above. In addition, a plasticizer, a dispersing agent, etc., may be added, and the specific examples thereof are as described above. The porosity of the formed sheet is preferably 10 to 53%, is particularly preferably 20 to 52%. When the porosity is below the lower limit, the formed sheet is too rigid, and may crack during hot pressing. This is not preferable since the performance of the oriented ceramic compact may be adversely affected. A porosity exceeding the upper limit is not preferable since it becomes difficult to retain the shape of the formed sheet. When the formed sheet is used as the releasing sheet, the releasing sheet may be degreased before performing hot press firing in step (b). The degreasing temperature may be set to a temperature at which organic matter contained in the releasing sheet is removed by heat. If the ceramic compact also needs to be degreased, the ceramic compact may be sandwiched between a pair of formed sheets so that the ceramic compact and the formed sheets can be degreased simultaneously. Alternatively, the ceramic compact and a pair of formed sheets may be separately degreased. When the hot press firing furnace is a graphite furnace and the ceramic is alumina, the material for the formed sheets is preferably carbon (for example, amorphous carbon, non-crystalline carbon, or graphite) or boron nitride since such a material rarely reacts with graphite and alumina. From the viewpoint of preventing the reaction of the formed sheets with graphite and alumina, carbon and boron nitride preferably have high purity. When the material for the formed sheets is carbon and when amorphous carbon or the like having a high specific surface area is used, dispersibility is degraded, and it becomes difficult to perform tape casting. Thus, from the viewpoint of ease of forming, non-crystalline carbon and graphite are preferable, and graphite is particularly preferable. However, even when high-purity carbon or boron nitride is used as the material for the formed sheets, it is considered that Al and the like from alumina would slightly diffuse into the formed sheets. Thus, the thickness of the formed sheets is preferably 10 μm or more. In this manner, it is possible to unfailingly avoid adhesion of the formed sheets to the structural parts (such as spacers and punches) of a graphite furnace. When the material for the formed sheets is carbon, the average particle diameter of the carbon particles is preferably 90% or less of the thickness of the formed sheet from the viewpoint of handling ease since the strength of the formed sheet is increased. When graphite formed sheets are used, a plate-like graphite powder is preferably used from the viewpoint of handling ease since the strength of the formed sheets after degreasing is improved. In particular, the strength can be further increased by preparing the releasing sheets by a forming method, such as a doctor blade method, that involves applying a shear force. When the material for the formed sheets is carbon, in step (c), after hot press firing, the oriented ceramic sintered body with the formed sheets adhering to the surfaces thereof may be discharged from the hot press firing furnace, and the formed sheets may be removed by burning. In this manner, the formed sheets can be relatively easily removed.

Figure 3:
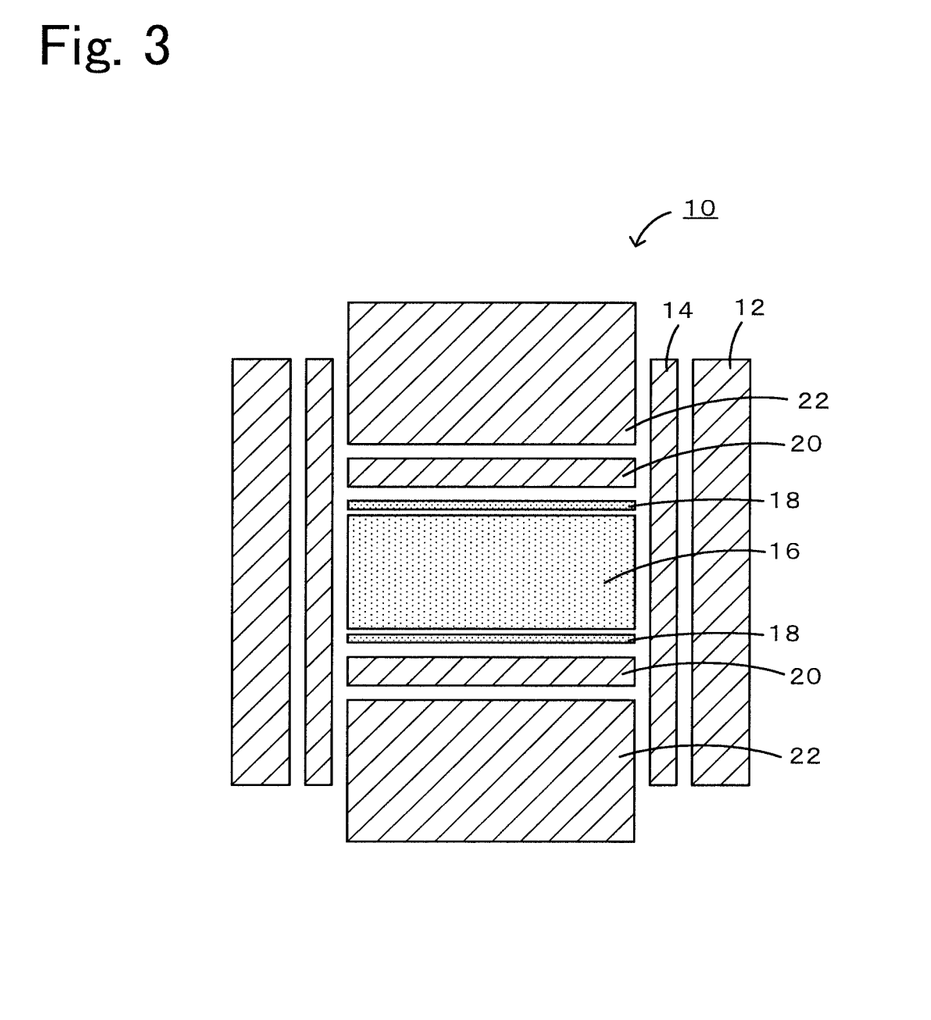
FIG. 3 is a cross-sectional view of a graphite furnace 10.

In step (b), an oriented ceramic sintered body is obtained by sandwiching the ceramic compact between a pair of releasing sheets, placing the ceramic compact and the releasing sheets in a hot press firing furnace, and hot press firing the ceramic compact while applying a pressure by a pair of punches through the pair of releasing sheets. In this case, spacers may be respectively disposed between the releasing sheets and punches. When more than one ceramic compacts are fired, spacers may be placed at desired positions so that the spacers contact the releasing sheets. A cross section of a graphite furnace 10, which is one example of the hot press firing furnace, is illustrated in FIG. 3. The graphite furnace 10 is equipped with a graphite mold 12 having a heater function, and a graphite sleeve 14 split into two parts in a vertical direction and placed inside the graphite mold 12. When a ceramic compact 16 is hot-press fired in this graphite furnace 10, the ceramic compact 16 is sandwiched between a pair of releasing sheets 18, 18, and then between a pair of graphite spacers 20, 20, and is placed inside the graphite sleeve 14. The ceramic compact 16 is heated while being pressed with a pair of graphite punches 22, 22. When the ceramic is alumina, the firing atmosphere in the hot press firing is not particularly limited, but is preferably an inert gas such as nitrogen or Ar, or a vacuum atmosphere. The pressure is preferably 50 kgf/cm$^2$ or more and more preferably 200 kgf/cm$^2$ or more. The firing temperature (highest attained temperature) is preferably 1700 to 2050° C. and more preferably 1750 to 2000° C. A pressing pressure of 50 kgf/cm$^2$ or more is preferably applied until a particular temperature (a temperature within the range of 1000 to 1400° C. (preferably 1100 to 1300° C.)) is reached as the temperature is decreased from the highest attained temperature. In this manner, the transparency of the obtained sintered body can be increased. Some degree of transparency can be obtained even when the pressure is immediately released after completion of keeping the highest attained temperature; however, the transparency can be increased by decreasing the temperature to a particular temperature while applying the pressing pressure. It is preferable to release the pressure to a pressure less than 50 kgf/cm$^2$ in a temperature zone lower than the particular temperature. In this manner, generation of cracks in the sintered body can be suppressed. The timing of decreasing the pressing pressure is critical from the viewpoints of transparency and suppression of cracks. The timing for releasing the pressure that achieves both is particularly preferably 1200° C. during the temperature decrease.

Figure 4:
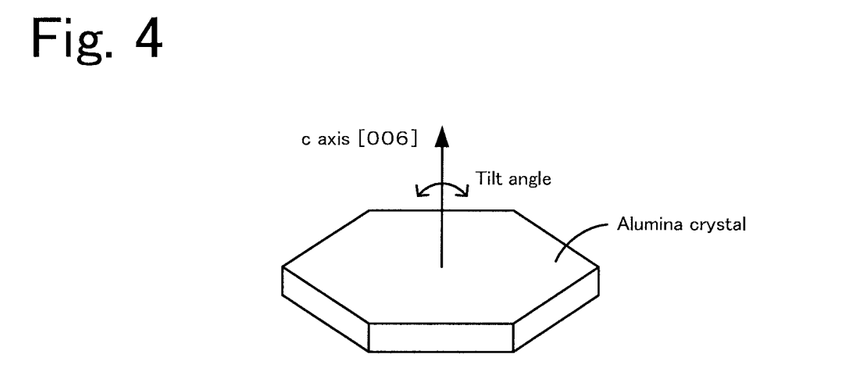
FIG. 4 is a diagram illustrating a tilt angle.

In the oriented ceramic sintered body obtained by the production method of the present invention, the crystal orientation of the surface does not deviate from the crystal orientation of the inside. The crystal orientation can be evaluated through a tilt angle, that is, a half width (XRC·FWHM) of an X-ray rocking curve obtaining by measuring an exposed surface of the oriented ceramic sintered body by an X-ray rocking curve method (omega scanning). The tilt angle of the oriented alumina sintered body is illustrated in FIG. 4. The meaning of "the crystal orientation of the surface does not deviate from the crystal orientation of the inside" is that the angle difference between XRC·FWHM of the surface and the XRC·FWHM of the inside is 3° or less, preferably 1° or less, more preferably 0.5° or less, and yet more preferably 0.2° or less. The oriented ceramic sintered body obtained by the production method of the present invention can be used in an optical device, a base substrate for an optical device, an epitaxial growth substrate, an electrostatic chuck, etc. Examples of the optical device and the base substrate for an optical device include LEDs, LDs, solar batteries, sensors, photo diodes, optical parts, and window materials.

A flat sheet of the present invention is as follows. That is, after the flat sheet is sandwiched between PET films having a thickness of 75 μm and an arithmetic mean surface roughness Ra of 0.03 μm, is then placed and vacuum-packed on a stainless steelsheet having a thickness of 10 mm and having an arithmetic mean surface roughness Ra of 0.29 μm, and is isostatically pressed at 200 kg/cm$^2$, a surface of the flat sheet on the side opposite from the stainless steel sheet has a profile curve with a total profile height Pt of 0.8 μm or less (preferably 0.5 μm or less). The material for this flat sheet is preferably carbon or boron nitride. The porosity of the flat sheet is preferably 10 to 53%. When a formed sheet is used as the releasing sheet, examples of the forming method include tape casting, extrusion molding, slip casting, injection molding, and uniaxial press forming. Among these, tape casting is preferable. When the material for the formed sheet is carbon, the average particle diameter of the carbon particles is preferably 90% or less of the thickness of the formed sheet from the viewpoint of handling ease since the strength of the formed sheet is increased. When graphite formed sheets are used, a plate-like graphite powder is preferably used from the viewpoint of handling ease since the strength of the formed sheets after degreasing is improved. In particular, the strength can be further increased by preparing the releasing sheets by a forming method, such as a doctor blade method, that involves applying a shear force. This flat sheet is suitable as a releasing sheet used during hot press firing, in particular, a releasing sheet used in the aforementioned oriented ceramic sintered body production method. The flat sheet can also be used as a releasing sheet when producing other fired compacts required to have smooth and flat surfaces. For example, the flat sheet can be used in press firing or normal-pressure stack firing of a metal, a non-oxide ceramic, an oxide ceramic, a single crystal material such as a silicon wafer or sapphire, or a composite thereof. Note that the normal-pressure stack firing is employed when it is desirable to increase the quantity of the compacts to be loaded in the furnace while preventing adherence of the fired compacts.

EXAMPLES

Experimental Example 1

1. Production of Alumina Sintered Body
(1) Production of Alumina Compact

A mixed alumina powder was prepared by mixing 0.5 parts by mass of a commercially available plate-like alumina powder (YFA10030 produced by KINSEI MATEC CO., LTD., average particle diameter: 10 μm, average thickness: 0.35 μm, aspect ratio: 29) and 99.5 parts by mass of a fine alumina powder (TM-DAR, average particle diameter: 0.1 μm produced by TAIMEI CHEMICALS Co., Ltd.). The mass ratio of the plate-like alumina powder to the fine alumina powder expressed as T:(100–T) is T=0.5. To 100 parts by mass of this mixed alumina powder, 0.0125 parts by mass (125 mass ppm) of magnesium oxide (500A produced by Ube Material Industries, Ltd.), 7.8 parts by mass of polyvinyl butyral (product No. BM-2, produced by SEKISUI CHEMICAL CO., LTD.) serving as a binder, 3.9 parts by mass of di(2-ethylhexyl)phthalate (produced by KUROGANE KASEI Co., Ltd.) serving as a plasticizer, 2 parts by mass of sorbitan trioleate (RHEODOL SP-O30, produced by Kao Corporation) serving as a dispersing agent, and 2-ethylhexanol serving as a dispersing medium were added, and the resulting mixture was mixed. The amount of the dispersing medium was adjusted so that the slurry viscosity was 20000 cP. The slurry prepared as such was tape-casted by a doctor blade method on a PET film so that the thickness after drying was 20 μm. The obtained tape was cut into a round shape having a diameter of 50.8 mm (2 inches), and 150 sheets cut as such were stacked.

(2) Production of Releasing Sheets

To 100 parts by mass of a commercially available graphite powder (SG-BH8, produced by Ito Graphite Co., Ltd., average particle diameter: 8 μm), 16 parts by mass of polyvinyl butyral (product No. BM-2, produced by SEKISUI CHEMICAL CO., LTD.) serving as a binder, 8 parts by mass of di(2-ethylhexyl)phthalate (produced by KUROGANE KASEI Co., Ltd.) serving as a plasticizer, 3 parts by mass of sorbitan trioleate (RHEODOL SP-O30, produced by Kao Corporation) serving as a dispersing agent, and 2-ethylhexanol serving as a dispersing medium were added, and the resulting mixture was mixed. The amount of the dispersing medium was adjusted so that the slurry viscosity was 20000 cP. The slurry prepared as such was tape-casted by a doctor blade method on a PET film so that the thickness after drying was 200 μm. A formed sheet (flat sheet) was obtained as a result. This formed sheet was used as a releasing sheet, as described below.

The total profile height Pt of the obtained formed sheet was measured as follows. That is, the formed sheet was sandwiched between PET films having a thickness of 75 μm and an arithmetic mean surface roughness Ra of 0.03 μm, was then placed and vacuum-packed on a stainless steel sheet having a thickness of 10 mm and having an arithmetic mean surface roughness Ra of 0.29 μm. Subsequently, isostatic pressing was performed at 200 kg/cm². Next, a profile curve of a surface of the formed sheet on the side opposite from the stainless steel sheet during isostatic pressing was measured. In the measurement, a small-size profile and roughness meter ("Form Talysurf plus" produced by Taylor-Hobson Limited) was used, and the measurement length was set to 5 mm. The result showed that the total height Pt was 0.355 μm.

The porosity of the obtained formed sheet was measured as follows. That is, the formed body after tape casting was cut into 30 mm×60 mm and weighed, and the porosity was measured from the following formula:

Porosity [%]=100−{(measured weight $X$)/(theoretical weight $Y$)×100}

(Theoretical weight $Y$)={(specific weight of graphite g/cm³)×$a$/100+(specific weight of binder g/cm³)×$b$/100+(specific weight of plasticizer g/cm³)×$c$/100+(specific weight of dispersing agent g/cm³)×$d$/100}×volume of cut-out piece (cm³)

where
a: Mass fraction (%) of added graphite powder
b: Mass fraction (%) of added binder
c: Mass fraction (%) of added plasticizer
d: Mass fraction (%) of added dispersing agent The results of the measurement indicated that the porosity of the formed sheet was 40.6%. The total profile height Pt and the porosity of the formed sheet of Experimental Example 1 are indicated in Table 1.

(3) Degreasing

The formed sheet was cut into disk-shaped pieces having the same size as the alumina compact, and the pieces were placed on both surfaces of the alumina compact. The alumina compact with the pieces placed thereon was placed on an Al plate having a thickness of 10 mm, and placed in a package. The interior was vacuumed to form a vacuum pack. This vacuum pack was isostatically pressed at a pressure of 100 kgf/cm² in 85° C. hot water so as to obtain a formed sheet/disk-shaped compact/formed sheet (three-layer structure). The three-layer structure was sandwiched between grid-shaped alumina setters and degreased at 440° C. for 10 hours. Of the formed sheet, the surface that contacts the alumina compact is the surface on the side opposite from the PET film during tape casting. In this manner, the alumina compact was degreased and formed an alumina degreased body, and the formed sheet was degreased and formed a graphite degreased body. As a result, a disk-shaped graphite degreased body/alumina degreased body/graphite degreased body (three-layer structure) was obtained.

(4) Firing

The graphite degreased body/alumina degreased body/graphite degreased body three-layer structure was fired in the graphite furnace 10 illustrated in FIG. 3 by hot pressing in nitrogen at a firing temperature (highest attained temperature of 1975° C.) for 4 hours at a surface pressure of 200 kgf/cm². As a result, an alumina sintered body was obtained. As the temperature was decreased from the firing temperature, the pressing pressure was retained until 1200° C., and the pressing pressure was released to zero in the temperature zone lower than 1200° C. During this process, although the graphite fired bodies were adhering to both surfaces of the alumina sintered body, neither the alumina sintered body nor the graphite fired bodies adhered to the structural parts (the graphite sleeve 14, the graphite spacers 20, the graphite punches 22, etc.) of the graphite furnace 10.

(5) Removal of the Graphite Fired Bodies

The alumina sintered body with the graphite fired bodies adhering to both surfaces thereof was placed in an electric furnace and heat-treated at 1000° C. in air for 1 hour to burn and remove the graphite fired bodies. As a result, an alumina sintered body was obtained.

2. XRC·FWHM of Alumina Sintered Body

Figure 5:
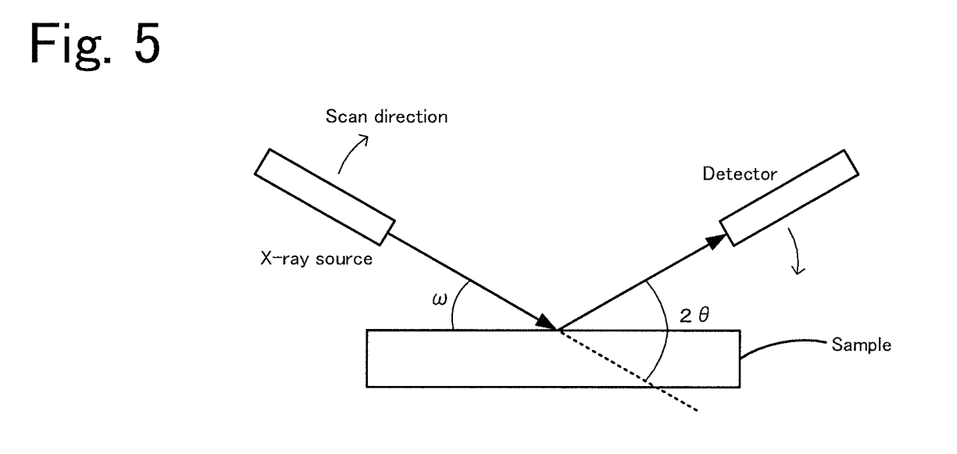
FIG. 5 is a diagram illustrating rocking curve measurement.

A rocking curve of a surface of the alumina sintered body was measured as follows. That is, the outermost surface (the same surface as that used in measuring the degree of c-plane orientation) of the alumina sintered body was scanned with an X-ray source and a detector in coordination as illustrated in FIG. 5, and the half width (XRC·FWHM) of the obtained curve was measured. This method of measurement involving fixing the value of 2θ (the angle between the detector and the incident X-ray) at the diffraction peak position and scanning only ω (the angle between the sample substrate surface and the incident X-ray) is referred to rocking curve measurement. The instrument used was RINT-TTR III produced by Rigaku Corporation, and Cu K-α radiation was used under conditions of a voltage of 50 kV and a current of 300 mA in a scanning range ω of 3.8° to 38.8°. The XRC·FWHM of the outermost surface of the alumina sintered body in Experimental Example 1 was 2.1°. Next, the outermost surface of the alumina substrate was grounded with #400 for 100 μm, and then the ground surface was measured in the same manner. XRC·FWHM was 2.1° (refer to Table 1 below). This shows that the obtained alumina sintered body was an oriented alumina sintered body, and the crystal orientation of the surface of the alumina sintered body was the same as the crystal orientation of the inside.

Experimental Example 2

In Experimental Example 2, a commercially available plate-like graphite powder (SGP-3, SEC carbon, average particle diameter: 3 μm) was used. An alumina sintered body was produced as in Experimental Example 1 except for the above-described graphite powder. The total profile height Pt and the porosity of the formed sheet of Experimental Example 2 were, respectively, 0.378 μm and 51.6% (refer to Table 1 below). The alumina sintered body had XRC·FWHM of 2.1° at the outermost surface, and XRC·FWHM of the surface after grinding for 100 μm (the inside) was also 2.1° (refer to Table 1 below). This shows that the obtained alumina sintered body was an oriented alumina sintered body, and the crystal orientation of the surface of the alumina sintered body was the same as the crystal orientation of the inside.

Experimental Example 3

In experimental Examples 1 and 2, commercially available graphite powders were used as the raw material for the formed sheets; alternatively, in Experimental Example 3, a commercially available boron nitride (USP-S2 produced by SHOWA DENKO K.K., average particle diameter: 0.6 μm) was used instead. An alumina sintered body was produced as in Experimental Example 1 except for the above-described boron nitride. The total profile height Pt and the porosity of the formed sheet of Experimental Example 3 were, respectively, 0.413 μm and 25.3% (refer to Table 1 below). The alumina sintered body had XRC·FWHM of 2.2° at the outermost surface, and XRC·FWHM of the surface after grinding for 100 μm (the inside) was also 2.2° (refer to Table 1 below). This shows that the obtained alumina sintered body was an oriented alumina sintered body, and the crystal orientation of the surface of the alumina sintered body was the same as the crystal orientation of the inside.

Experimental Example 4

In Experimental Example 4, a commercially available graphite powder (FS-1 produced by SHOWA DENKO K.K., average particle diameter: 0.5 μm) was used as the raw material for the formed sheet. An alumina sintered body was produced as in Experimental Example 1 except for the above-described boron nitride. The total profile height Pt and the porosity of the formed sheet of Experimental Example 4 were, respectively, 0.784 μm and 36.4% (refer to Table 1 below). The alumina sintered body had XRC·FWHM of 3.2° at the outermost surface, and XRC·FWHM of the surface after grinding for 100 μm (the inside) was also 3.2° (refer to Table 1 below). This shows that the obtained alumina sintered body was an oriented alumina sintered body, and the crystal orientation of the surface of the alumina sintered body was the same as the crystal orientation of the inside.

Experimental Example 5

In Experimental Example 5, a commercially available expandable graphite sheet (NICAFILM FL-400, produced by Nippon Carbon Co., Ltd.) was used as the releasing sheet instead of producing the formed sheet. An alumina sintered body was produced as in Experimental Example 1 except for the above-described graphite sheet. The total profile height Pt and the porosity of the releasing sheet of Experimental Example 5 were, respectively, 1.074 μm and 53.8% (refer to Table 1 below). The porosity of this expandable graphite sheet was calculated from the above-described formula by setting a=100, b=0, c=0, and d=0. The alumina sintered body had XRC·FWHM of 11.8° at the outermost surface, and XRC·FWHM of the surface after grinding for 100 μm (the inside) was 6.1° (refer to Table 1 below). This showed that although the obtained alumina sintered body was an oriented alumina sintered body, there was a large deviation of the crystal orientation of the surface of the alumina sintered body from the crystal orientation of the inside.

TABLE 1

| Experimental Example | Releasing sheet Type | Pt (μm) | Porosity (%) | Oriented alumina sintered body XRC·FWHM(°) Outermost surface | Grounded for 100 μm |
|---|---|---|---|---|---|
| 1 | Graphite sheet (tape casted) | 0.355 | 40.6 | 2.1 | 2.1 |
| 2 | Graphite sheet (tape casted) | 0.378 | 51.6 | 2.1 | 2.1 |
| 3 | Boron nitride sheet (tape casted) | 0.413 | 25.3 | 2.2 | 2.2 |
| 4 | Boron nitride sheet (tape casted) | 0.784 | 36.4 | 3.2 | 3.2 |
| 5 | Commercially available graphite sheet | 1.074 | 53.8 | 11.8 | 6.1 |

Experimental Examples 1 to 4 correspond to the examples of the present invention, and Experimental Example 5 corresponds to a comparative example. Naturally, the present invention is not limited by the experimental examples described above and can be implemented in various forms without departing from the technical scope of the present invention.

The present application claims priority to Japanese Patent Application No. 2017-207783 filed Oct. 27, 2017, the entire contents of which are incorporated herein by reference.

What is claimed is:

1. An oriented ceramic sintered body production method comprising:
   (a) a step of preparing a ceramic compact before firing into an oriented ceramic sintered body; and
   (b) a step of obtaining an oriented ceramic sintered body by sandwiching the ceramic compact between a pair of releasing sheets, placing the ceramic compact and the releasing sheets in a hot press firing furnace, and hot press firing the ceramic compact while applying a pressure by a pair of punches through the pair of releasing sheets,
   wherein the releasing sheet used in step (b) has a total profile height Pt of 0.8 µm or less when the releasing sheet is measured by a predetermined measurement procedure, wherein the predetermined measurement procedure comprises, first, the releasing sheet is sandwiched between PET films having a thickness of 75 µm and an arithmetic mean surface roughness Ra of 0.03 µm to form a three-layer structure, next, a vacuum-packed product is obtained by placing the three-layer structure on a stainless steel sheet having an arithmetic mean surface roughness Ra of 0.29 µm and vacuum-packing, then, the vacuum-packed product is isostatically pressed at 200 kg/cm², and then, a total profile height Pt of a cross-sectional curve on a surface of the releasing sheet of the vacuum-packed product opposite to the stainless steel sheet side is measured, and,
   wherein the releasing sheets have a porosity of 10% to 53%.

2. The oriented ceramic sintered body production method according to claim 1, wherein:
   in step (a), the ceramic compact is prepared by forming a slurry that contains a mixed ceramic powder, a binder, and a dispersion medium, the mixed ceramic powder containing a plate-like ceramic powder and a fine ceramic powder having a smaller average particle diameter than the plate-like ceramic powder, and
   in step (b), the ceramic compact is degreased before hot press firing.

3. The oriented ceramic sintered body production method according to claim 1,
   wherein the releasing sheets are obtained by forming a slurry containing a releasing sheet raw material powder, a binder, and a dispersion medium into a sheet shape.

4. The oriented ceramic sintered body production method according to claim 1,
   wherein, in step (b), spacers are respectively interposed between the releasing sheets and the punches.

5. The oriented ceramic sintered body production method according to claim 1,
   wherein the ceramic is alumina.

6. The oriented ceramic sintered body production method according to claim 5, wherein:
   the hot press firing furnace is a graphite furnace, and
   a material for the releasing sheets is carbon or boron nitride.

7. The oriented ceramic sintered body production method according to claim 5, wherein:
   a material for the releasing sheets is carbon, and
   in step (b), after the hot press firing, the oriented ceramic sintered body with the releasing sheets adhering to surfaces thereof is discharged from the hot press firing furnace, and the releasing sheets are removed by burning.

* * * * *